H. C. MALLORY.
EXPANSIBLE AND COLLAPSIBLE ELEMENT FOR THERMOSTATIC AND PRESSURE SENSITIVE DEVICES.
APPLICATION FILED APR. 22, 1914. RENEWED DEC. 5, 1919.
1,366,473.
Patented Jan. 25, 1921.
2 SHEETS—SHEET 1.
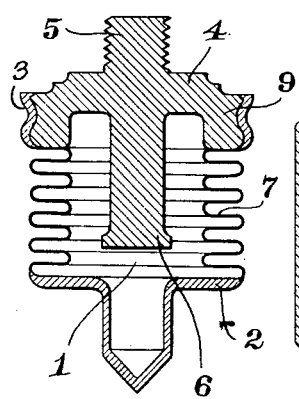
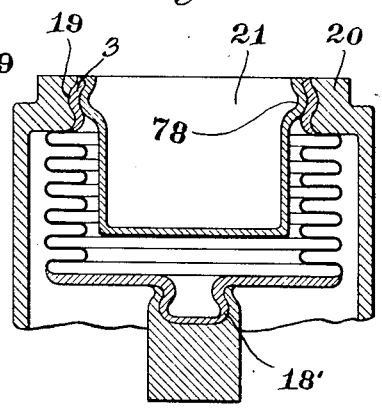
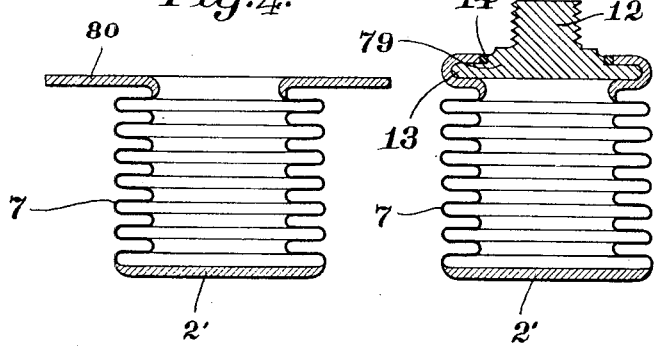

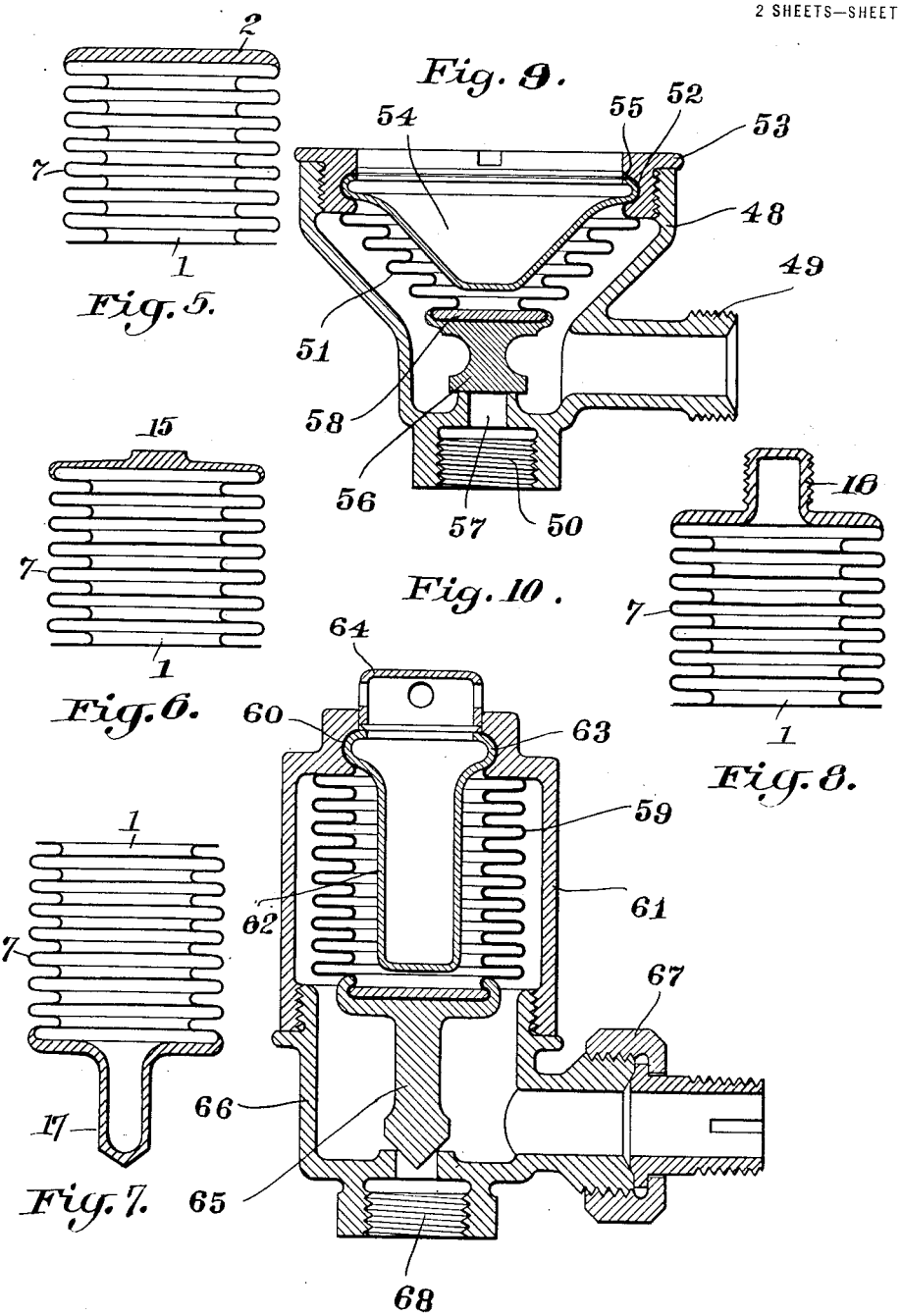

UNITED STATES PATENT OFFICE.

HARRY C. MALLORY, OF BELLPORT, NEW YORK.

EXPANSIBLE AND COLLAPSIBLE ELEMENT FOR THERMOSTATIC AND PRESSURE-SENSITIVE DEVICES.

1,366,473.     Specification of Letters Patent.     Patented Jan. 25, 1921.

Application filed April 22, 1914, Serial No. 833,593. Renewed December 5, 1919. Serial No. 342,802.

*To all whom it may concern:*

Be it known that I, HARRY C. MALLORY, a citizen of the United States, residing at Bellport, in the county of Suffolk and State of New York, have invented certain new and useful Improvements in Expansible and Collapsible Elements for Thermostatic and Pressure-Sensitive Devices, of which the following is a full, clear, and exact specification.

My invention relates generally to expansible and collapsible elements for thermostatic and pressure sensitive devices, such as are designed for use in fluid pressure motors, steam traps, expansion joints, damper regulators, and the like.

A full understanding of the invention will be attained from the following description illustrating its several features in a preferred form, taken in connection with the accompanying drawings and specifically pointed out in the appended claims.

In the drawing,

Figure 1 is a cross-section of a portion of a thermostat showing an expansible and collapsible vessel of the bellows type attached to a head;

Fig. 2 is a cross-section of another type of thermostat showing a modified method of attaching the element;

Fig. 3 illustrates a method of attaching and sealing another type of element to its holding member;

Fig. 4 shows a completed element of the same type, ready for attachment to its holding member;

Fig. 5 is an illustration of a further modified form of another element of the bellows type;

Fig. 6 shows a modification of Fig. 5;

Fig. 7 shows a method of utilizing a portion of the element to form a valve head;

Fig. 8 shows a method of utilizing a portion of the element to form a means for attaching a valve head;

Fig. 9 is a cross-section of a steam trap showing a modified flexible element of the diaphragm type and a method of attaching it to the valve casing and the valve head; and Fig. 10 is a cross-section of a thermostatic steam trap employed in vacuum heating systems showing a further modified method of attaching an element to the tubes.

In thermostatic and pressure sensitive devices, such as fluid pressure motors, steam traps, damper regulators, thermostats and the like, where an expansible and collapsible metal element is employed to transmit motion in response to fluctuations of temperature or pressure it is necessary that the joint at the point of attachment of the element to the particular type of device with which it is employed be tight against fluid pressure and that the joining process not weaken the element at this point. In such devices one end of the element is usually held rigid and the other end or head is movable and attached to some part of the device for the transmission of power or motion, for instance, to the valve member of a thermostatic steam trap. The strain at the joint is sometimes very great at the period of maximum expansion of the element and rupture is accordingly exceedingly liable to occur at a weakened point in the element. It has formerly been the practice to employ solder or to form a brazed joint for attaching the element. This method has been found exceedingly unsatisfactory for the reason that a different temper is thereby imparted to the thin wall of the element at the point of attachment and consequently the resistance of the metal to strain is materially weakened. Although the employment of solder is necessary in some cases when it is desired that the joint be hermetically sealed, I have discovered that by firmly pressing the end of the element into some portion of the device to which it is attached and so securing the element, that it is possible to have the sealing action entirely independent of the attaching action. In other words, the element is retained in its position solely because of the pressure employed and its contact with the part of the device and not because of any action exerted by the solder, its effect being only to seal the joint hermetically. In this way, I have altogether obviated interference and destruction of the temper of the metal and have accordingly secured a much stronger and more satisfactory joint, without dispensing with the beneficial effects accruing from the employment of solder.

In the forms of my invention illustrated in Figs. 1 and 2, the above result is attained in the following manner: For purposes of illustration, I show a corrugated vessel 1 of the bellows type which is generally employed in thermostatic steam traps, having a closed end or head 2 and an open end 3 which is attached to a part of the trap, for instance, the head piece 4 to form a thermostat or chamber confining a volatile fluid sensitive to changes in temperature. The head piece is provided with a screw-threaded portion 5 for securing the thermostat in position in the trap and with a tail piece 6 projecting into the chamber. As shown, the open and closed ends of the flexible vessel are reinforced or strengthened by being made greater in cross-section than the intermediate corrugated portion 7 which is comparatively thin. This construction of vessel is preferably obtained by drawing it from a suitable metal blank in the form of a shell having a closed end, in such a way that the various thicknesses mentioned are obtained and then by corrugating in any well known manner the intermediate thin portion. It is preferable that the thick portions of the shell taper gradually into the intermediate thin portion. Thus between the thin part which is resilient and the thick part which is rigid the boundary lies in the part of tapered thickness, and by making this part tapered instead of abrupt this transition region is somewhat diffused and a tendency to break apart there is obviated.

In the form shown in Fig. 1, the head piece is provided with an annular curved depression 9 into which the thick open end 3 is clamped or pressed into a firm frictional contact. The vessel is thus supported solely by contact with the head piece, and the use of solder at the point of attachment with its attendant disadvantages is eliminated. The joint will be found exceedingly strong and capable of resistance to far greater pressures than has been found in preëxisting structures, as well as simple in construction and easy to make.

In Figs. 3 and 4, I have illustrated modifications of vessels in which the open thick end is flared to form an outwardly projecting annular flange 80 which is adapted to be rolled around and over the flange 13 of the type of head piece or plug 79 shown in Fig. 3. The head piece may be similarly provided with a screw-threaded lug 12 for attachment to the casing of the trap. Except for the flaring operation, the method of making the vessel is similar to that employed with the forms shown in Figs. 1 and 2. In the forms shown in Figs. 3, 4, and 5 the head or closed end 2' is flat.

The present type of vessel will be found particularly advantageous when it is desired to make a hermetically sealed joint which is effected by rolling the flared end 80 over the flange 13 in such manner that a space 14 is left between the end of the vessel and the inner wall of the flange 13 which may be filled with solder. If the soldering operation is carried out with the vessel immersed in water, all disturbance of the temper of the metal at its end is prevented and consequent weakening of the joint avoided. It will be noted that the solder plays no part in maintaining the vessel on its support, the effect being solely to render the joint hermetically sealed.

Figs. 5, 6 and 7 illustrate modifications in which only the head or closed end of the vessel is greater in cross-section than the intermediate portion. As shown in Fig. 6, the closed end may be tapered gradually into the thin intermediate portion of the metal leaving a central portion 15 in the end of greatest rigidity and an annular portion 16 gradually increasing in flexibility until it merges into the thin intermediate portion of the metal. The head or end being integral with the corrugated portion of the vessel, the use of a seam is dispensed with and the vessel is thereby rendered much stronger, a peculiarly valuable feature in hermetically sealed vessels as such devices must be made as seamless and jointless as possible. The greatly reduced cost of manufacture as compared with present devices of this character is another advantage which must not be overlooked.

Another novel feature lies in the fact that the thick end may be so shaped by drawing the metal as to form a valve head 17 integral with the vessel (see Fig. 7), reducing any liability of the thermostat to get out of order and requiring fewer repairs because of the reduction in the number of parts.

In Fig. 8 I show a vessel having its thick closed end shaped to form a lug 18, to which a valve head may be attached, either by screw-threading the lug or in any other well known manner. In Fig. 2 the lug 18' is shown as being pressed into the recessed valve head, the end of which is firmly clamped around the lug.

Another method of attaching the open end of the vessel is illustrated in Fig. 3, which shows the end 2 pressed into a groove 19 in an orifice in the valve bonnet 20 by a cup shaped head 21 having an annular flange 78 which is forced into the same groove. It will be noted that the thick open ends of the vessels may be screw-threaded, if so desired.

In Fig. 9 there is illustrated a diaphragm type of thermostat used in a steam trap of valves which consists of a valve casing 48 adapted to be connected to a regulator by a screw thread as shown at 49 and having an interior screw threaded portion 50 adapted to be connected to an air and water escape. The diaphragm 51 is secured in the valve casing by pressing its open end which in this case is of the same cross section as in the intermediate corrugated portion, into an annular groove 52 formed in the flange 53 screwed into the valve casing. The cup shaped member 54 is expanded into the same groove thus securely holding the diaphragm in its position. An annular groove 55 is provided in the flange in case it is desired to employ solder for the purpose of hermetically sealing the joint. The advantages of this construction have heretofore been fully explained in detail and consequently, it is not necessary to enlarge upon them. The valve head 56 which is adapted when the diaphragm is expanded to seat over the opening 57 is secured to the closed smaller end of the diaphragm by forming a recess in its upper face and clamping the ends of the recess around and over the reinforced end 57 of the diaphragm. Reinforcement is obtained by incorporating a metal disk 58 in the first corrugation at the time when the corrugating process is carried out.

Fig. 10 illustrates a further application of my invention, in this case to a thermostat steam trap such as is designed for use in connection with vacuum heating systems. In this case the flexible element employed is of the bellows type as shown at 59 and has its open end secured in a groove 60 in the valve bonnet 61 by means of the tubular shaped member 62 which projects in the diaphragm and is provided with an expanded portion 63 entering the groove 60 and exerting pressure on the end of the flexible vessel to maintain it in position. A perforated metal cap 64 is placed over the member 62 to prevent dirt from entering the interior and at the same time permit free circulation of air. A valve stem 65 is secured to the closed end of the vessel in the same manner as is shown in Fig. 9. The valve body 66 is connected to the radiator by means of a union nut 67, and has a threaded connection 68 to the escape or the return pipe.

The operation of thermostatic steam traps of the two types above referred to is so well known in the art that it is not thought necessary to enter into any detailed description herein.

While I have herein shown and described certain forms and constructions of elements whereby variations in atmospheric pressure in temperature may be utilized and have illustrated various methods of application of such elements, it will be understood that my invention is not limited either to any specific form of element or to any specific application, and that the inventive idea is capable of wide modification and may be embodied in many forms without departing from the scope thereof.

In the following claims I employ the term "flange" to designate the projecting open end portion of the shell, whether it projects out as a plane annulus as in Fig. 4, or as a cylindrical extension as in Figs. 1 and 2.

What is claimed is:

1. A wall for an expansible and collapsible element having a corrugated main portion and an integrally reinforced closed end joining the corrugated part of the wall by a tapering portion.

2. A wall for an expansible and collapsible element formed of resilient metal having a flexible intermediate portion and an integral end portion of greater cross-section than said intermediate portion, the end portion and the intermediate portion being joined by a portion of tapering thickness.

3. A wall for an expansible and collapsible element formed by pressure from seamless metal having a resilient intermediate portion and integrally reinforced closed end portion.

4. A wall for an expansible and collapsible element having a flexible intermediate portion and a reinforced flanged open end portion tapering into the flexible intermediate portion.

5. An expansible and collapsible element having a thin resilient wall of seamless metal and a relatively thick closed end of greater cross-section tapering into the resilient wall.

6. A wall for an expansible and collapsible vessel having a flexible intermediate portion and with one end open and the other end closed, the open end being surrounded by a flange portion, and said flange portion being reinforced, the reinforcement tapering into the flexible intermediate portion.

7. A wall for an expansible and collapsible vessel having a flexible intermediate portion surrounded by a flange portion, said flange portion being reinforced, the reinforcement tapering into the flexible intermediate portion.

8. A wall for an expansible and collapsible vessel having a flexible intermediate portion and with one end open and the other end closed, the open end being surrounded by a flange portion, said flange portion being reinforced, and the closed end of said wall also being reinforced, the reinforcement tapering into the flexible intermediate portion.

9. A wall for an expansible and collapsible element having a flexible intermediate portion and a reinforced flanged open end portion tapering into the said intermediate portion.

10. A wall for an expansible and collapsible element having a flexible intermediate portion and an integrally reinforced flanged open end portion tapering into the said intermediate portion.

In testimony whereof I affix my signature, in presence of two witnesses.

HARRY C. MALLORY.

Witnesses:
 EDWARD S. WHITE,
 G. N. KERR.